US010955237B2

(12) United States Patent
Munzert et al.

(10) Patent No.: US 10,955,237 B2
(45) Date of Patent: Mar. 23, 2021

(54) MEASUREMENT METHOD AND MEASUREMENT APPARATUS FOR CAPTURING THE SURFACE TOPOLOGY OF A WORKPIECE

(71) Applicant: BLACKBIRD ROBOTERSYSTEME GMBH, Garching (DE)

(72) Inventors: Ulrich Munzert, Kranzberg (DE); Michael Denk, Eching (DE); Martin Zeitler, Berg (DE)

(73) Assignee: Blackbird Robotersysteme GmbH, Garching (DE)

( * ) Notice: Subject to any disclaimer, the term of this patent is extended or adjusted under 35 U.S.C. 154(b) by 450 days.

(21) Appl. No.: 16/081,158

(22) PCT Filed: Mar. 1, 2017

(86) PCT No.: PCT/EP2017/054681
§ 371 (c)(1),
(2) Date: Aug. 30, 2018

(87) PCT Pub. No.: WO2017/148966
PCT Pub. Date: Sep. 8, 2017

(65) Prior Publication Data
US 2021/0033390 A1 Feb. 4, 2021

(30) Foreign Application Priority Data
Mar. 4, 2016 (DE) .......................... 102016103954.3

(51) Int. Cl.
*G01B 11/30* (2006.01)
*G01B 9/02* (2006.01)
(Continued)

(52) U.S. Cl.
CPC ........... *G01B 11/303* (2013.01); *B25J 19/021* (2013.01); *G01B 9/02091* (2013.01); *G01B 11/0608* (2013.01); *B25J 11/005* (2013.01)

(58) Field of Classification Search
CPC .............. G01B 11/303; G01B 11/0608; G01B 9/02091; G01B 11/0675; G01B 11/0691; G01B 11/2441; B25J 19/021; B25J 11/005
See application file for complete search history.

(56) References Cited

U.S. PATENT DOCUMENTS

| 8,410,392 B2 | 4/2013 | Kogel-Hollacher et al. |
| 8,517,537 B2 | 8/2013 | Suehira et al. |

(Continued)

FOREIGN PATENT DOCUMENTS

| CN | 101646525 | 2/2010 |
| CN | 101802542 | 8/2010 |

(Continued)

OTHER PUBLICATIONS

German Search Report (102016103954.3), dated Nov. 30, 2016.
(Continued)

*Primary Examiner* — Hina F Ayub
(74) *Attorney, Agent, or Firm* — Dority & Manning, P.A.

(57) ABSTRACT

A measuring device and measuring method for capturing a surface topology of a workpiece uses an optical coherence tomograph having a reference arm guided by a manipulator or a deflection unit to position a measuring region of the scanner. The reference arm is guided along an actual track, which at least partially deviates from an intended track due to disturbing influences like lag errors of the manipulator. An actual distance ($d_m$) between a zero point of the measuring region and a workpiece surface is measured at at least one measuring point of the actual track. A planning path length (Continued)

($l_p$) of the reference arm is established for the at least one measuring point for the compensation of the disturbing influences, and the measured actual distance ($d_m$) is normalized to a standard distance ($d_n$) with the aid of the planning path length ($l_p$).

20 Claims, 5 Drawing Sheets

(51) Int. Cl.
*B25J 9/02* (2006.01)
*G01B 11/06* (2006.01)
*B25J 19/02* (2006.01)
*B25J 11/00* (2006.01)

(56) References Cited

U.S. PATENT DOCUMENTS

| | | |
|---|---|---|
| 9,127,929 B2 | 9/2015 | Siercks et al. |
| 2002/0198457 A1 | 12/2002 | Tearney et al. |
| 2012/0257207 A1* | 10/2012 | Marx ............... G01B 11/06 356/451 |
| 2016/0039045 A1 | 2/2016 | Webster |
| 2016/0059350 A1 | 3/2016 | Schoenleber et al. |
| 2016/0356595 A1* | 12/2016 | Lessmueller ...... G01B 9/02091 |

FOREIGN PATENT DOCUMENTS

| | | |
|---|---|---|
| CN | 202149732 U | 2/2012 |
| CN | 102599882 | 7/2012 |
| DE | 102014011569 | 2/2016 |
| WO | WO 2014138939 | 9/2014 |

OTHER PUBLICATIONS

English translation of the IPRP, dated Sep. 13, 2018.
Chinese Office Action, dated Jan. 19, 2020, 6 pages.
Chinese Office Action dated Sep. 16, 2020 and Translation, 12 pages.
International Search Report (PCT/EP2017/054681), dated Apr. 13, 2017.

* cited by examiner

MEASUREMENT METHOD AND MEASUREMENT APPARATUS FOR CAPTURING THE SURFACE TOPOLOGY OF A WORKPIECE

CROSS-REFERENCE TO RELATED APPLICATIONS

This application claims priority to International Application Serial No. PCT/EP2017/054681, filed Mar. 1, 2017, which claims priority to German Application No. 10 2016 103 954.3 filed Mar. 4, 2016. International Application Serial No. PCT/EP2017/054681 is hereby incorporated herein in its entirety for all purposes by this reference.

FIELD OF THE INVENTION

The present invention relates to a measuring method for capturing a surface topology of a workpiece with the aid of an optical coherence tomograph.

Furthermore, the invention relates to a measuring device for capturing a surface topology of a workpiece with the aid of an optical coherence tomograph.

BACKGROUND OF THE INVENTION

Measuring methods of this type are sufficiently known from the related state of the art and are used, in particular, for determining the quality of welds and the like, which have been produced with the aid of a processing laser. A relative motion between the workpiece to be captured and a scan head is generally made possible in this case by a robot and/or a deflection unit. The surface of the workpiece can be scanned and analyzed in this way. The controllers of the axes of the robot strive to follow an intended track in this case in order to achieve a result which is as accurate as possible. Due to the delayed response of the axes to commands, a tracking error frequently results, however, which negatively affects the entire analysis.

BRIEF OBJECTS AND SUMMARY OF THE INVENTION

The problem addressed by the present invention is therefore that of creating a measuring method and a measuring device for capturing a surface topology, which reliably ascertains the quality-measuring measuring results.

The problem is solved by a measuring method and a measuring device having the features described below.

The invention relates to a measuring method for capturing a surface topology of a workpiece of an optical coherence tomograph. In doing so, a measuring region of a reference arm of the optical coherence tomograph is guided along an actual track with the aid of a manipulator and/or a deflection unit. The manipulator is preferably an industrial robot which can implement not only manufacturing methods but also positioning and measuring tasks. Moreover, the reference arm of the optical coherence tomograph can be guided, in a targeted manner, along the surface topology to be analyzed, or transversely thereto, with the aid of the deflection unit, in particular with the aid of multiple movable mirrors. The surface topology to be analyzed can be, for example, in the post-processing a weld or a cut located downstream and/or in the pre-processing an edge or a shoulder located upstream. A movement program is preferably created on the basis of this surface topology, and so the measuring region is guided along this surface topology, in particular, however, along an intended track.

An actual distance between a zero point of the measuring region and a workpiece surface is measured at at least one measuring point of the actual track. In this case, the measuring region preferably extends coaxially to the reference arm and/or is approximately 10 mm to 20 mm in size, wherein, in particular, only one half of the measuring region is usable. The measuring region is preferably essentially halved by the zero point, and therefore the zero point lies approximately in the center of the measuring region. Within the scope of establishing the intended track, the workpiece surface is placed within the measuring region, slightly above or below the zero point. The actual distance between the zero point and the workpiece surface is measured with the aid of the coherence tomography scanner. In order to measure the surface topology at least for one scan, multiple measurements are carried out point-by-point, and so an actual distance is measured for each measuring point. These actual distances can then be stored as height pixels, possibly along with further values such as intensity and/or quality.

The actual track at least partially deviates from the intended track due to disturbing influences. For example, the mechanical inertia of the manipulator results in lag errors which are essentially in the form of the planned measuring points of the intended track preceding the measuring points of the actual track. A reciprocating movement by the deflection unit can also result in a corrupted measurement.

According to the invention, it is provided that a planning path length of the reference arm is established, in particular, in advance (i.e., before the measurement), in order to compensate the disturbing influences for the at least one measuring point. This planning path length corresponds to a planned length of the reference arm at the particular measuring time which is assumed freely or is determined and is not measured. The planning path length can be established by a user on the basis of empirical values, in order to reduce the computing time. The actually measured actual distance between the zero point and the workpiece surface is then normalized to a standard distance with the aid of the planning path length. In this way, this measuring point and the subsequent measuring points are referenced to the same starting point, and therefore the height pixels are made comparable. Only as a result thereof does it finally become possible to draw error-free inferences regarding the surface topology on the basis of the height pixels. The disturbing influences corrupting the result can therefore be compensated in an easy way via computing, without the need to fundamentally change the measuring device.

It is advantageous when a measuring data set is stored for the at least one measuring point as starting information for calculating the standard distance. The measuring data set is determined, in this case, by an optical actual path length of the reference arm, the measured actual distance, and the planning path length. The optical actual path length of the reference arm is determined by the distance between a system-internal light source and the zero point of the measuring region. The optical actual path length is therefore a known length which can be individually adjusted with the aid of the manipulator and/or the deflection unit. The actual distance is measured proceeding from the zero point which is located essentially on the workpiece-side end of the reference arm. The planning path length can be calculated as a distance value, but can also be nearly arbitrarily established. The measuring data set is stored in a memory unit. Data which are sufficient for quality assurance can be gathered on the basis of the measuring data set, in order to be able to trace the measurements in detail even after the normalization to the standard distance.

It is also an advantage when the standard distance is calculated from the difference between a computed value formed from the measuring data set and the planning path length. The computed value is formed, in this case, from the sum or the difference of the optical actual path length and the measured actual distance. Whether the computed value is formed from the sum or the difference ultimately depends on the position of the zero point. The position of the normalization point is initially not significant, although it can also be possible that the position of the normalization point is to be taken into consideration in special cases, however. In one advantageous embodiment of the invention, the zero point of the measuring region and the normalization point are located above the workpiece. In yet another alternative embodiment of the invention, the zero point of the measuring region is located above the workpiece and the normalization point is located below the workpiece. In each of these two cases, in which the zero point is located above the workpiece, the computed value is calculated from the sum of the optical actual path length and the actual distance. If the zero point is located below the workpiece, however, the computed value is calculated from the difference between the actual path length and the actual distance. In this case, the zero point of the measuring region and the normalization point can both be located below the workpiece. It is also conceivable, however, that the zero point of the measuring region is located below the workpiece and the normalization point is located above the workpiece. The measuring method can be readily adapted to highly diverse conditions by way of the simple calculation of the standard distance and the different possibilities for the placement of the calculating components in the course of the measuring method.

Advantageously, a normalization line is established for normalizing multiple measured actual distances, wherein this takes place, in particular, by a user on the basis of empirical values. One normalization point is established in each measurement according to the point-by-point measurement, on the basis of which the actual track is finally generated. The individual normalization points are then connected to form the normalization line. An associated normalization point does not necessarily need to be formed for each measuring point, however. In principle, one single normalization point is also sufficient for referencing the actual distance. The normalization point or the normalization line can be located above or below the workpiece in this case. The standard distance can be easily formed with reference to the normalization line, and therefore the disturbing influences can be compensated with little effort.

It is also advantageous when the normalization line is defined independently of or depending on the intended track. Generally, the capture of the surface topology is carried out by a trained person who places the normalization line in the vicinity of the intended track with reference to empirical values. In order to avoid errors resulting from an incorrect establishment of the normalization line, the normalization line can also be determined in a manner which is completely detached from the intended track, however. Alternatively, it can also be advantageous when the normalization line is defined according to the intended track which is to be expected or which is specified. In doing so, the normalization line can be established at least partially identically to the intended track. It is also conceivable that the normalization line is similar to the intended track. In addition, it is also possible that only individual values, in particular a start value and/or end value, are identical thereto. The normalization line can be established independently of the knowledge of the user, and therefore the accuracy of the normalization is ensured in any case.

The normalization line is advantageously established as a straight line and/or a curve, at least in some regions. Alternatively or additionally, it is advantageous when the normalization line is located above and/or below the workpiece surface, at least in some regions. The formation of the normalization line is selected depending on the knowledge of the user and the complexity of the surface. In establishing the intended track, it should be ensured, however, that the component is located above or below the workpiece during the entire measurement. The selected region should remain unchanged during the measurement, if possible, since the side on which the measurement was finally carried out can no longer be traced afterward on the basis of the measuring data set.

With reference to the normalization line, the planning path length of the reference arm associated with each individual measuring point is advantageously determined and/or stored, in particular with the aid of a processing unit, for each individual measuring point. As a result, a standard distance can be measured for each measured actual distance of the particular measuring point.

It is also advantageous when the planning path length is determined, depending on the particular measuring point, as the distance between the normalization line and a system-internal reference point. The planning path lengths are pure planning data, with the aid of which the offset of lag errors and the like is made possible. In principle, it would also be conceivable to define the planning path lengths using an arbitrary, system-independent value.

It is also advantageous when the movement program for the deflection unit and/or the manipulator is generated depending on the intended track and/or the normalization line. In this case, an intended position is transmitted to the manipulator and/or the deflection unit via an axis control for each measuring point. The manipulator and/or the deflection unit are/is adjusted according to the specified intended value with the aid of the axis control. Since the adjustment of the manipulator and/or the deflection unit cannot take place infinitely rapidly, however, the measurement-corrupting tracking error results. The tracking error is compensated by the standard distance.

The intended track is advantageously established before the measurement in such a way that the workpiece surface to be measured is located within the measuring region when the measuring region is moved along the intended track. In this way, it is ensured that the measurements can be reliably carried out.

In order for the workpiece to be located in the measuring region during the entire measurement, it is advantageous when the optical actual path length of the reference arm is appropriately adjusted as an approximation of the intended track. For this purpose, the user specifies the intended track depending on the workpiece to be captured, and so the workpiece is located in the measuring region for the entire period of time of the measurement which is considered to be ideal. By way of the axis control, the movement of the manipulator and/or the deflection unit is specified to the manipulator and/or the deflection unit in such a way that the planned measuring points are approached in succession, and so the actual track is ultimately formed. Due to lag errors and the reciprocal movements, it cannot be completely ensured by way of the specification of the intended track and the control of the manipulator and the deflection unit according to this intended track that the workpiece in the course of the actual track always lies in the measuring region. The likelihood is very low, however, since the rough geometry of the workpiece was taken into account at least in the course of the intended track, and therefore the errors are ultimately due only to the component inertia. These deficiencies can also be compensated by assuming the normalization line.

A normalized scan of the workpiece is advantageously generated in an, in particular, path- and/or time-dependent diagram with the aid of the calculated standard distances. The normalized scan is essentially a sampling rate across the region of the workpiece to be measured. The entire scan is subdivided into path sections, wherein each path section represents one measuring point. These measuring points are plotted in the diagram on the x-coordinate axis. The standard distance is then plotted on the y-coordinate axis for each path section. It is also conceivable, instead of the individual path sections, to break down the duration of the scan into the measuring points thereof. The scan is two-dimensional. As a result, the user can evaluate the surface topology of the workpiece in an easy way.

It is also advantageous when the normalized scan of the workpiece is analyzed with the aid of evaluation algorithms. On the basis of the preferably mathematical evaluation algorithm, further measures can be defined, with the aid of which, for example, a defective weld is reworked.

It is also advantageous when multiple scans are combined in order to form a height map. The values entered in the diagram impart a merely two-dimensional nature to the measurement, and therefore the user can draw inferences regarding the surface topology only with respect to the one scan. Frequently it is necessary, however, to analyze the entire surface topology. This becomes possible by placing the individual scans next to one another according to their sequence. This yields a three-dimensional image of the workpiece in the form of a height map. The seam quality can be easily evaluated, for example, in this way.

Furthermore, a measuring device for capturing a surface topology of a workpiece is suggested. The measuring device includes at least one optical coherence tomograph, a manipulator, and/or a deflection unit, and a processing unit. The optical coherence tomograph is designed for measuring an actual distance between a zero point of a measuring region of the optical coherence tomograph and a workpiece surface. The measuring region can be guided along an actual track with the aid of the manipulator and/or the deflection unit. The processing unit is designed for compensating measuring errors, in particular lag errors.

According to the invention, it is provided that the processing unit is designed in such a way that the measured actual distance can be normalized with the aid of a measuring method according to the preceding description, wherein the aforementioned features can be present individually or in any combination. As a result, it is possible to design a measuring device with a considerably reduced error rate without making any design changes.

BRIEF DESCRIPTION OF THE DRAWINGS

Further advantages of the invention are described in the following exemplary embodiments. Wherein.

DETAILED DESCRIPTION

Figure 1:
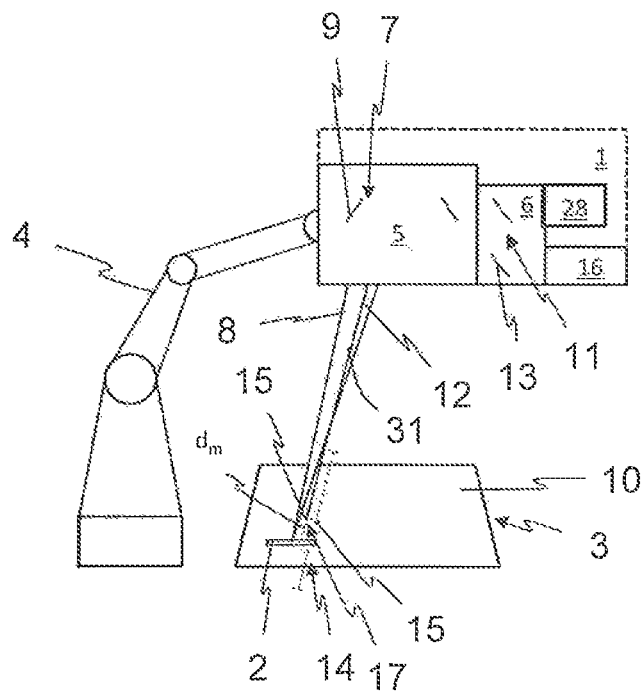
FIG. 1 shows a schematic representation of a machining scanner comprising a measuring device.

FIG. 1 shows a schematic representation of a measuring device 1 for capturing a surface topology 2 of a workpiece 3. In doing so, the measuring device 1, spaced apart from the workpiece 3, is moved over the workpiece 3 with the aid of a manipulator 4. According to the present exemplary embodiment, the manipulator 4 is a multiaxial industrial robot, on the free end of which the measuring device 1 is situated. The measuring device 1 comprises a point distance sensor which is designed as an optical coherence tomograph 28 in this case. By way thereof, a measuring beam 31, in particular a laser beam, is directed onto the workpiece surface 10. The measuring device 1 also comprises a measuring scanner 6, with the aid of which the measuring beam 31 can be deflected via at least one rotatably mounted mirror 13.

The measuring device 1 can also include a machining scanner 5 which is installed downstream from the measuring scanner 6. The machining scanner 5 includes a first deflection unit 7. With the aid of the first deflection unit 7, a machining beam 8 of the machining scanner 5, in particular a laser beam, can be deflected via at least one movable mirror 9. The workpiece 3 is machined with the aid of the machining beam 8 of the machining scanner 5, i.e., in particular being marked, cut, or welded. In doing so, the surface topology 2 to be investigated by the measuring device 1, in particular the measuring scanner 6, is changed.

According to the present exemplary embodiment, the measuring scanner 6 is fixedly coupled to the machining scanner 5. The measuring scanner 6 and the machining scanner 5 are therefore jointly moved by the manipulator 4. Alternatively, said measuring scanner and said machining scanner can also comprise separate manipulators 4, however. The measuring scanner 6 can also be situated so as to be detached from the manipulator 4, however. The measuring beam 31 of the measuring scanner 6 can be additionally moved relative to the manipulator movement with the aid of a second deflection unit 11 in order to perform a distance measurement. For this purpose, the second deflection unit 11 comprises at least one second mirror 13.

According to FIG. 1, the position of the measuring point 17 of the measuring beam 31 is therefore influenced by the manipulator movement, the deflection movement of the first deflection unit 7, and the deflection movement of the second deflection unit 11. Therefore, these are mutually superimposed movements.

The optical coherence tomograph 28 comprises a reference arm 12 which is formed by one portion of the beam path of the measuring beam 31. In the area of its end, the reference arm 12 comprises a measuring region 14. The end of the reference arm 12 forms a zero point 15 of the measuring region 14 in this case. The optical coherence tomograph 28 measures a distance between the workpiece surface 10 located in the measuring region 14 and the zero point 15.

The length of the reference arm 12 and the position of the measuring region 14 in the z-direction can be changed with the aid of an adjusting device which is not represented here. Preferably, the adjusting device is integrated in the optical coherence tomograph 28. The length of the reference arm 12 is preferably controlled in such a way that the workpiece surface 10 is located in the measuring region 14 during the entire measurement. The length of the reference arm 12 is furthermore selected in such a way that the zero point 15 is located above or below the workpiece surface 10 during the entire measurement. According to FIG. 1, the measuring region 14 extends from a region above the workpiece 3, in particular from a side facing the measuring device 1, to below the workpiece 3. In any case, the measurement relates to the zero point 15 of the measuring region 14, which essentially halves this measuring region 14. In the represented exemplary embodiment, the zero point 15 of the measuring region 14 is located just above the workpiece 3. It is also conceivable, however, to locate the zero point 15 below the workpiece 3.

The reference arm 12 is displaced, with the aid of an axis control 16, across the surface topology 2 to be captured, and therefore an actual distance $d_m$ between the zero point 15 and the workpiece surface 10 can be measured at at least one measuring point 17. In doing so, the axis control 16 can influence the adjusting device, the manipulator, the first deflection unit, and/or the second deflection unit. The position of the zero point 15 or of the entire measuring region 14 can be changed via an axis control 16 by way of the reference arm 12, in particular, being displaced. In the represented exemplary embodiment, the measuring point 17 is at the same level as the zero point 15 of the measuring region 14. It is also conceivable, however, that the measuring point 17 is located above or below the zero point 15.

Figure 2A:
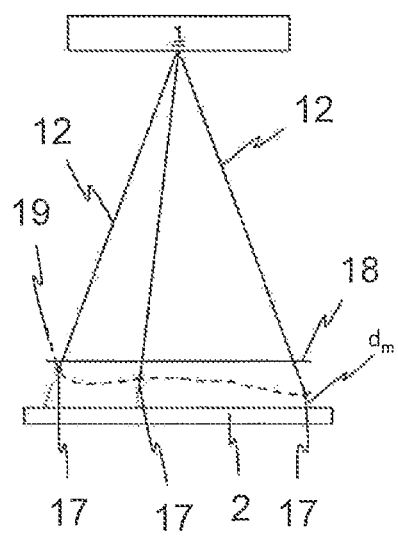
FIG. 2a shows a schematic progression of the capture of a surface topology.
Figure 2B:
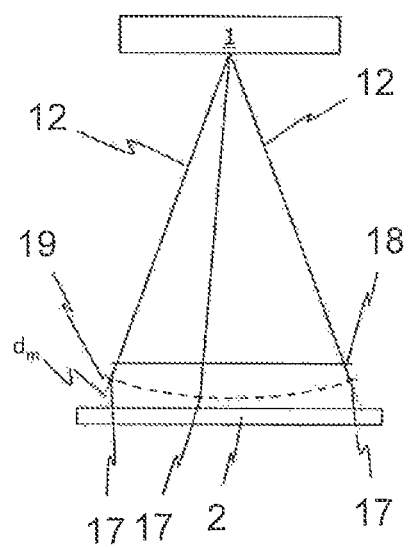
FIG. 2b shows a schematic progression of the capture of a surface topology according to yet another exemplary embodiment.

FIGS. 2a and 2b show a schematic progression of the capture of the surface topology 2. In both FIGS. 2a, 2b, an intended track 18 is initially specified depending on the surface topology 2 to be captured, according to which the reference arm 12 is to be displaced with the aid of the axis control 16 (not represented), the manipulator 4, and/or the second deflection unit 11 of the measuring device 1 in order to measure distance. The objective, therefore, is to move the zero point 15 of the measuring region 14 along the intended track 18.

In FIG. 2a, the reference arm 12 of the measuring scanner 6 is moved by the manipulator 4 (cf. FIG. 1) along the intended track 18 in order to carry out a distance measurement at each of multiple measuring points 17. Since the manipulator 4 cannot move infinitely rapidly, however, the reference arm 12 is not guided precisely along the intended track 18, but rather along an actual track 19. In this case, one refers to a lag error. Proceeding from the measuring points 17 forming the actual track 19, in particular proceeding from the zero point 15 (cf. FIG. 1), the actual distance $d_m$ is measured for each measuring point 17 with the aid of the measuring scanner 6 which is not represented. The actual distance $d_m$ is therefore the distance between the zero point 15 and the workpiece surface 10, which is corrupted by the lag error and which is actually measured.

The reference arm 12 of the progression represented in FIG. 2b is to be guided along the intended track 18 only by the second deflection unit 11 (cf. FIG. 1). In this case as well, however, the actual track 19 deviates from the planned intended track 18, in particular due to the reciprocating movements of the second mirror 13 of the second deflection unit 11.

Figure 3:
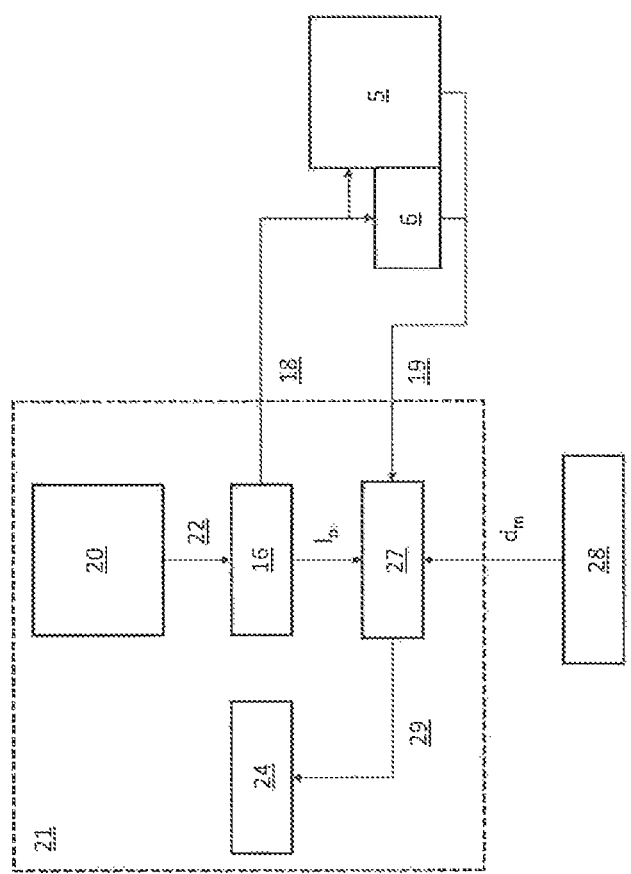
FIG. 3 shows a schematic flow chart for the compensation of disturbing influences.
Figure 4:
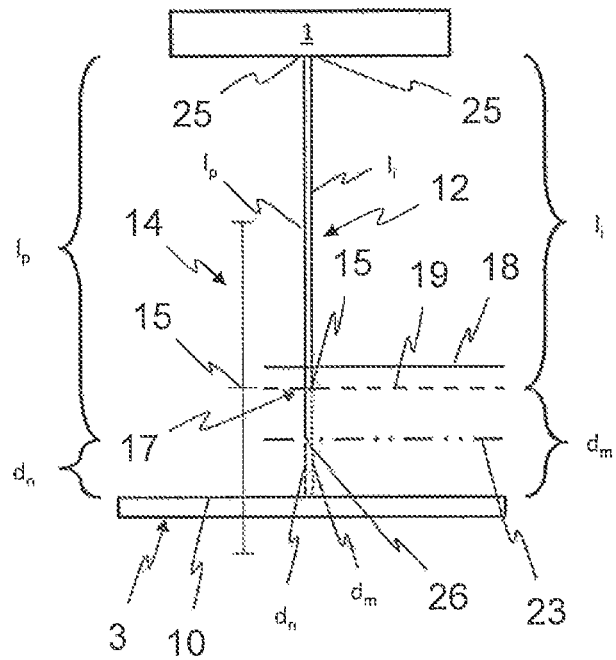
FIG. 4 shows a schematic representation of the normalization of a measuring point.

The following FIGS. 3 and 4 now show how the above-described disturbing influences can be compensated. FIG. 3 shows a schematic flow chart for the compensation of the disturbing influences. The normalization of the measurement is schematically represented in FIG. 4 for the purpose of illustration. Initially, the intended track 18 is specified by a user (not represented). The intended track 18 is established, depending on the workpiece surface 10 to be captured, in such a way that the workpiece surface 10 is located in the measuring region 14 (cf. FIG. 1, FIG. 4) during the entire measurement. The intended track 18 is established with reference to empirical values.

For this purpose, the desired intended track 18 is specified by a user (not represented) in a programming environment 20 or, generally, in a control unit 21. Depending on the intended track 18, a movement program 22 for the axis control 16 is generated by the programming environment 20, and therefore the measuring beam 31 and the reference arm 12 are guided along the workpiece surface 10 in such a way that the workpiece surface 10 is located within the measuring region 14 (cf. FIG. 4) during the entire measurement. The movement of the manipulator 4 (not represented) and/or the second deflection unit 11 is preferably also influenced on the basis of the movement program 22.

Moreover, a normalization line 23, which is shown in FIG. 4, is specified in the programming environment 20, in particular by the user. In the represented exemplary embodiment (cf. FIG. 4), the normalization line 23 as well as the intended track 18 are located above the workpiece surface 10. The normalization line 23 is established as a data set in the control unit 21. With reference to the normalization line 23, a planning path length $l_p$ of the reference arm 12 is established in a processing unit 24 (cf. FIG. 3). The planning path length $l_p$ could be considered, according to FIG. 4, to be the distance between a system-internal reference point 25 located in the measuring device 1, in particular in the measuring scanner 6, and a normalization point 26 lying on the normalization line 23. The planning path length $l_p$ is a hypothetical value, however, which does not necessarily need to be related to the actual measuring method. The planning path length $l_p$ is stored in a memory unit 27.

The measurement itself is carried out, according to FIG. 3, by the optical coherence tomograph 28. With the aid of the optical coherence tomograph 28, the actual distance $d_m$ from the zero point 15 of the measuring region 14 to the workpiece surface 10 (cf. FIG. 4) can be determined. In addition, an optical actual path length $l_i$ is determined, which extends from a scan head (not represented) to the zero point 15 of the measuring region 14. In addition to the optical actual path length $l_i$, the actual distance $d_m$ and the planning path distance $l_p$ are stored in the memory unit 27 as a measuring data set 29.

In order to now be capable of compensating the disturbing influences, the measuring data set 29 according to FIG. 3 is further processed by the processing unit 24. For this purpose, a standard distance $d_n$ (cf. FIG. 4) is determined for each individual measurement. In order to be capable of determining the standard distance $d_n$ for the represented exemplary embodiment, the sum of the optical actual path length $l_i$ and the measured actual distance $d_m$ must be initially calculated. This yields a computed value for the further processing. Subsequently, the difference of the computed value and the planning path length $l_p$ is formed. The value calculated in this way is the standard distance $d_n$. This is a distance which is referenced to the normalization line 23 and, therefore, is normalized.

The same approach can be applied for multiple measuring points 17, wherein an individual planning path length $l_p$, the measured actual distance $d_m$, and the optical actual path length $l_i$ are determined for each measuring point 17 and are stored in the memory unit 27. The actual track 19 is formed by stringing together multiple actual measuring points 17.

In the following description of the alternative exemplary embodiments represented in FIGS. 5 to 6, identical reference signs are utilized for features which are identical and/or at least comparable in terms of their design and/or mode of operation as compared to the first exemplary embodiment represented in FIG. 4. Provided said alternative exemplary embodiments are not explained again in detail, their design and/or mode of operation correspond to the design and mode of operation of the features already described above.

Figure 5:
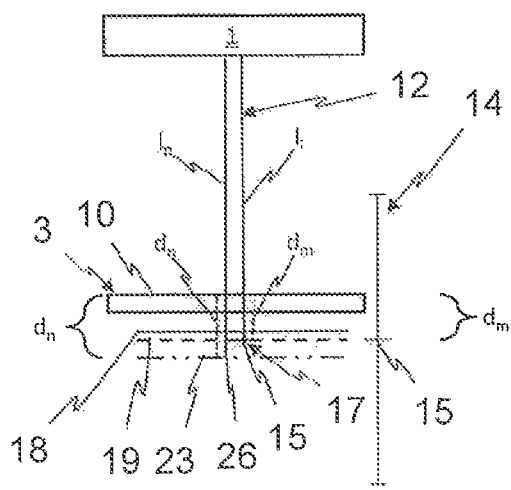
FIG. 5 shows a schematic representation of a second exemplary embodiment for the normalization of a measuring point.

FIG. 5 shows a second exemplary embodiment for the normalization of disturbing influences. In this case, the intended track 18 and the normalization line 23 are located below the workpiece 3. The computed value for calculating the standard distance $d_n$ is formed from the difference of the actual path length $l_i$ and the actual distance $d_m$. The standard distance $d_n$ is also formed from the difference of the planning path length $l_p$ with respect to the computed value.

In yet another exemplary embodiment (not represented), it is furthermore conceivable that the normalization line 23 is located above the workpiece 3 and the intended track 18 is located below the workpiece 3. Moreover, it is conceivable that the intended track 18 is located above the workpiece 3 and the normalization line 23 is located below the workpiece 3. It is advantageous when their position relative to the workpiece surface 10 does not change during the entire measurement, i.e., they are each located either above or below the workpiece surface 10.

Figure 6:
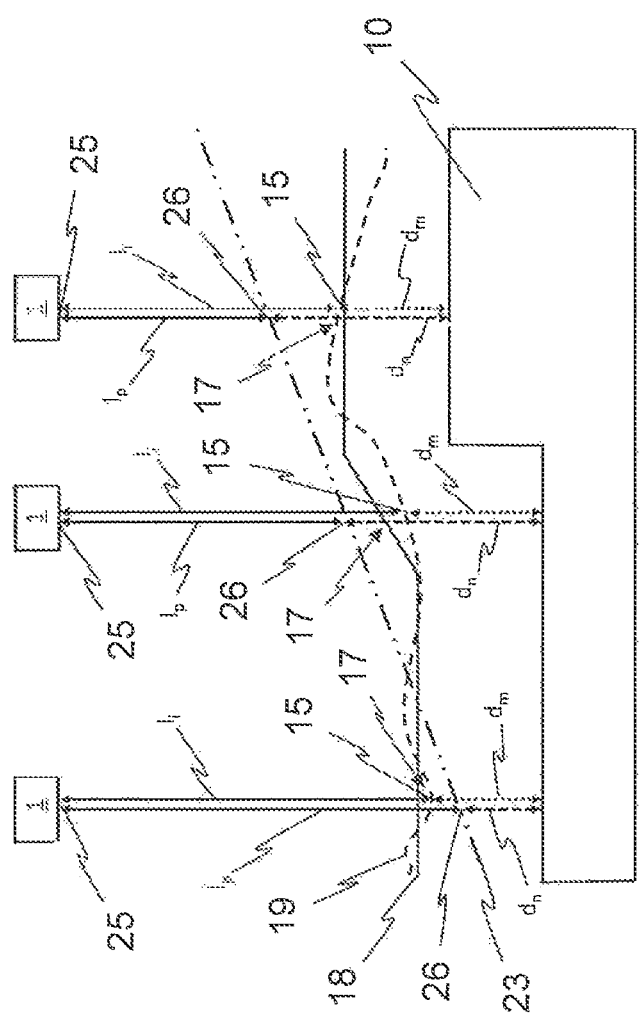
FIG. 6 shows a schematic representation of the capture of a workpiece via multiple measuring points.

Represented in FIG. 6 is an overall capture of the workpiece surface 10 via three measuring points 17. The intended track 18 is formed according to the workpiece surface 10 assumed by the user. The normalization line 23 is situated, as a straight line, in the Cartesian space and partially identically to the intended track 18. A movement program 22 for the axis control 16 is generated (cf. FIG. 3) by the programming environment 20 depending on the intended track 18, and so all three measuring points 17 are controlled in succession by the measuring scanner 6. Due to the inertia of the axis control 16, the measuring points 17 are not controlled according to the intended track 18, however, but rather with a disturbing influence. As a result, the zero points 15 for each measuring point 17 do not lie on the intended track 18, but rather above or below said intended track. The actual track 19 is formed by connecting the individual zero points 15.

The actual path length $l_i$ is then determined for each measuring point 17 proceeding from the measuring scanner 6 to the particular zero point 15. Moreover, the actual distance $d_m$ is determined by the optical coherence tomograph 28 for each measuring point 17, proceeding from the zero point 15. In addition, an associated planning path length $l_p$ is established for each measuring point 17. In this case, the planning path length $l_p$ extends, proceeding from the system-internal reference point 25, to the normalization point 26. The calculation of the standard distance $d_n$ takes place, as described above, by forming the difference of the computed value and the planning path length $l_p$. The calculated standard distances $d_n$ can then be analyzed and further processed with the aid of mathematical evaluation algorithms.

Figure 7:
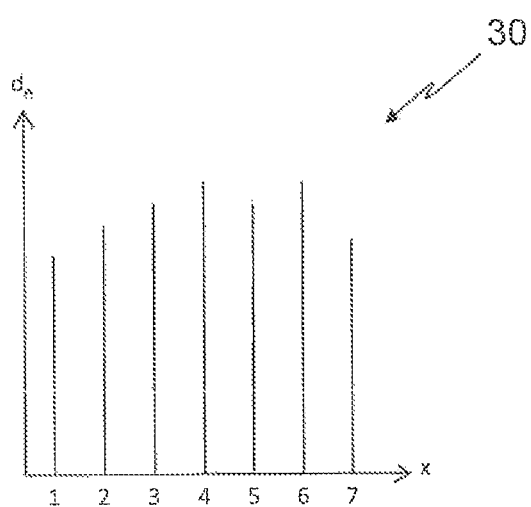
FIG. 7 shows a path-dependent diagram for representing ascertained standard distances.

FIG. 7 shows a schematic representation of how the standard distances $d_n$ can be represented in a path-dependent diagram 30. For this purpose, the diagram 30 comprises an x-axis. The measuring points 17, which are uniformly distributed across the measurement, are plotted on the x-axis. Each measuring point 17 is plotted and labeled in the diagram 30 in FIG. 7 according to the sequence in which said measuring points are measured. According to the diagram 30, the actual distances $d_m$ were therefore measured at seven measuring points 17 over the period of time of the scan. A normalized standard distance $d_n$ was calculated for each measuring point 17. Each of the calculated standard distances $d_n$ is plotted on the y-axis of the diagram 30.

The present invention is not limited to the exemplary embodiments which have been represented and described. Modifications within the scope of the claims are also possible, as is any combination of the features, even if they are represented and described in different exemplary embodiments.

LIST OF REFERENCE SIGNS 1 measuring device
2 surface topology
3 workpiece
4 manipulator
5 machining scanner
6 measuring scanner
7 first deflection unit
8 machining beam
9 first mirror
10 workpiece surface
11 second deflection unit
12 reference arm
13 second mirror
14 measuring region
15 zero point
16 axis control
17 measuring point
18 intended track
19 actual track
20 programming environment
21 control unit
22 movement program
23 normalization line
24 processing unit
25 reference point
26 normalization point
27 memory unit
28 optical coherence tomograph
29 measuring data set
30 diagram
31 measuring beam
$d_m$ actual distance
$d_n$ standard distance
$l_i$ actual path length
$l_p$ planning path length

The invention claimed is:

1. A measuring method for capturing a surface topology of a workpiece with the aid of an optical coherence tomograph, in which a measuring region of a reference arm of the optical coherence tomograph is guided, with the aid of a manipulator and/or a deflection unit, along an actual track which at least partially deviates from an intended track due to disturbing influences, the method comprising the steps of:

measuring an actual distance between a zero point of the measuring region and a workpiece surface at at least one measuring point of the actual track, establishing for the compensation of disturbing influences for the at least one measuring point, a planning path length of the reference arm and using the planning length to normalize the measured actual distance to a standard distance.

2. The measuring method as recited in claim 1, wherein a measuring data record and the planning path length are stored in a memory unit, for the at least one measuring point, as the starting information for calculating the standard distance.

3. The measuring method as recited claim 2, wherein the measuring data record includes an optical path length of the reference arm and the measured actual distance.

4. The measuring method as recited in claim 1, wherein the standard distance is calculated from the difference between a computed value formed from the measuring data set and the planning path length.

5. The measuring method as recited claim 4, wherein the computed value is formed from the sum or difference of the optical actual path length and the measured actual distance.

6. The measuring method as recited in claim 1, wherein a normalization line is established by a user on the basis of empirical values in order to normalize multiple measured actual distances.

7. The measuring method as recited in claim 1, wherein the normalization line is defined independently of the intended track.

8. The measuring method as recited in claim 1, wherein the normalization line is situated above the workpiece surface in some areas and below the workpiece in other areas.

9. The measuring method as recited in claim 1, wherein a processing unit is used to determine the associated planning path length of the reference arm stored for each individual measuring point with reference to the normalization line.

10. The measuring method as recited in claim 1, wherein the planning path length is determined, depending on the particular measuring point, as the distance between the normalization line and a system-internal reference point.

11. The measuring method as recited in claim 1, wherein a movement program for the deflection unit and/or the manipulator is generated depending on the intended track and/or the normalization line.

12. The measuring method as recited in claim 1, wherein the intended track defines a course and is established before the measurement in such a way that the workpiece surface to be measured is located within the measuring region when the measuring region is moved along the intended track.

13. The measuring method as recited in claim 1, wherein the intended track is adjusted in such a way that the course of the optical actual path length of the reference arm is adjusted within the course of the intended track.

14. The measuring method as recited in claim 1, wherein a normalized scan of the workpiece is generated in a path-dependent diagram or a time-dependent diagram with the aid of the calculated standard distances.

15. The measuring method as recited in claim 1, wherein the normalized scan of the workpiece is analyzed with the aid of evaluation algorithms.

16. The measuring method as recited in claim 1, wherein multiple normalized scans are combined in order to form a height map.

17. A measuring device for detecting a surface topology of a workpiece, the measuring device comprising:

an optical coherence tomograph configured for measuring an actual distance between a zero point of a measuring region of the optical coherence tomograph and a workpiece surface, a manipulator and/or a deflection unit configured for guiding the measuring region along an actual track, and a processing unit configured for the compensation of measuring errors;

wherein the processing unit is designed in such a way that the measured actual distance can be normalized to a standard distance with the aid of a measuring method as recited in claim 1.

18. The measuring method as recited in claim 1, wherein the normalization line is defined dependently of the intended track, wherein the normalization line is at least partially identical to the intended track, is similar to the intended track, and/or at least individual values of the normalization line are identical to the intended track.

19. The measuring method as recited in claim 1, wherein the normalization line is established to include a straight line and a curve line.

20. The measuring method as recited in claim 1, wherein the normalization line is established in order to normalize multiple measured actual distances.

* * * * *